United States Patent [19]

Takado et al.

[11] Patent Number: 5,123,688
[45] Date of Patent: Jun. 23, 1992

[54] AUTOMOBILE BUMPER HAVING SMOOTH SURFACE AND MANUFACTURED BY A BLOW MOLDING PROCESS

[75] Inventors: Yutaka Takado; Masayuki Yamazaki, both of Kanagawa; Takashi Mikami, Tokyo; Tetsuo Tomiyama, Kanagawa, all of Japan

[73] Assignee: Tonen Sekiyukagaku K.K., Tokyo, Japan

[21] Appl. No.: 689,432

[22] Filed: Apr. 23, 1991

Related U.S. Application Data

[62] Division of Ser. No. 159,967, PCT/JP87/00448, Jun. 30, 1987.

[30] Foreign Application Priority Data

Jun. 30, 1986 [JP] Japan ............................. 61-154856

[51] Int. Cl.⁵ ............................................ B60R 19/04
[52] U.S. Cl. ..................................... 293/120; 293/155
[58] Field of Search ................................ 293/120–122, 293/136, 155

[56] References Cited

U.S. PATENT DOCUMENTS

| | | | |
|---|---|---|---|
| 2,829,915 | 4/1958 | Clavean | 293/120 X |
| 3,140,329 | 7/1964 | Nutting | 264/242 |
| 3,287,198 | 11/1966 | Batttenfeld | 156/518 |
| 3,734,554 | 5/1973 | Schwabenlender | 293/121 |
| 3,744,656 | 7/1973 | Schiemann Wolfram | 215/31 |
| 4,066,285 | 1/1978 | Hall et al. | 280/770 X |
| 4,171,143 | 10/1979 | Huber et al. | 293/121 |
| 4,323,411 | 4/1982 | Uhlig | 156/245 |
| 4,492,398 | 1/1985 | Peter | 293/120 |
| 4,586,738 | 5/1986 | Butler et al. | 293/107 |
| 4,634,566 | 1/1987 | Schlenz | 264/515 |
| 4,652,032 | 3/1987 | Smith | 293/120 |
| 4,664,958 | 5/1987 | Jones | 428/36 |
| 4,715,473 | 12/1987 | Tschudin-Mahrer | 181/286 |
| 4,721,593 | 1/1988 | Kowal | 264/258 |
| 4,724,115 | 2/1988 | Freeman | 264/513 |
| 4,824,504 | 1/1989 | Kagata | 156/216 |
| 4,940,270 | 7/1990 | Yamazaki et al. | 293/122 |

FOREIGN PATENT DOCUMENTS

| | | | |
|---|---|---|---|
| 2541765 | 3/1977 | Fed. Rep. of Germany . | |
| 2364789 | 5/1978 | France | 293/136 |
| 56-126133 | 10/1981 | Japan . | |
| 56-136331 | 10/1981 | Japan . | |
| 57-178724 | 11/1982 | Japan . | |
| 58-45921 | 3/1983 | Japan . | |
| 85759 | 6/1984 | Japan | 293/122 |
| 60-82323 | 5/1985 | Japan . | |
| 0189659 | 9/1985 | Japan | 293/121 |
| 61-144328 | 7/1986 | Japan . | |

*Primary Examiner*—Dennis H. Pedder
*Attorney, Agent, or Firm*—Armstrong, Nikaido, Marmelstein, Kubovcik & Murray

[57] ABSTRACT

A high shock-absorbing automobile bumper with a smooth outer surface which may be manufactured by loading a preformed surface skin member into a blow mold, and then blowing a parison in the mold so that the blow parison is bonded to the surface skin member. The result is a hollow cushioning body firmly bonded to the surface skin member.

2 Claims, 3 Drawing Sheets

AUTOMOBILE BUMPER HAVING SMOOTH SURFACE AND MANUFACTURED BY A BLOW MOLDING PROCESS

This is a division of application Ser. No. 159,967 filed as PCT/JP87/00448, Jun. 30, 1987.

TECHNICAL FIELD

This invention relates to a method for producing an automobile bumper.

BACKGROUND ART

An automobile bumper is usually made of an exterior surface skin, a cushioning body to absorb shocks, and a reinforcement adapted to reduce elastic deformation. The bumper is made of metal or plastics. The metal bumper is heavy and is permanently deformed when hit. The plastics bumper is free of such a disadvantage.

While an injection-molded plastics bumper has a smooth surface, it has a lower impact-resistance and thus needs a heavy, stiff reinforcement, making it difficult to reduce the weight of the entire bumper.

In contrast, a plastics bumper produced by blow molding is excellent in impact resistance (absorption of impact force): however, it has a rather rough surface, because it is made of a low-flow synthetic resin to provide drawdown resistance during the blow molding, and also because its blow pressure applied on the mold wall is so low that the contours of the mold are not fully transferred to the resin.

DISCLOSURE OF THE INVENTION

Accordingly, it is an object of this invention to overcome the above-mentioned disadvantages, and to provide a method for economically producing an automobile bumper having a good appearance and high shock-absorbing properties.

By this invention an automobile bumper is produced by a method comprising the steps of loading a preformed surface skin member into a blow mold, and then blowing a parison in the mold, thereby obtaining a hollow cushioning body firmly bonded to the surface skin member.

By the method of the invention a surface skin member is preformed by, for example, injection molding, and then loaded into a blow mold where a parison is blow-molded until it is bonded to the surface skin member, thereby providing a hollow cushioning body unitarily formed with the surface skin member. Thus, the blow molding and bonding operations are accomplished simultaneously. The injection-molded surface skin member overlays the bumper to produce a neat appearance.

PREFERRED EMBODIMENTS TO CARRY OUT THE INVENTION

Figure 1:
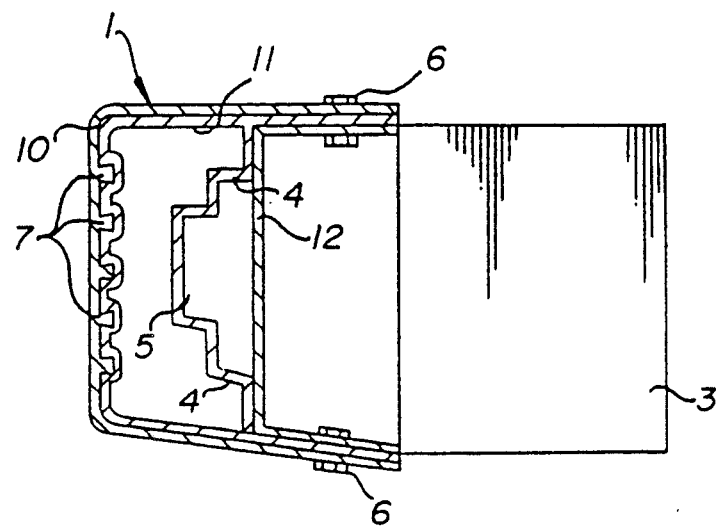
FIG. 1 is a vertical sectional side view showing an example of the automobile bumper of the invention.
Figure 2:
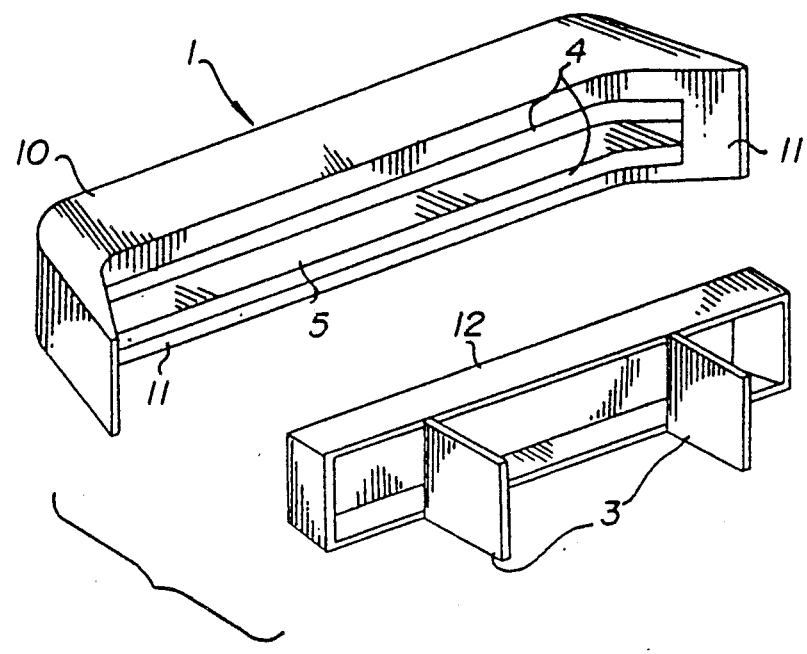
FIG. 2 is an exploded perspective view of the bumper shown in FIG. 1.

The invention is now described in more detail by reference to the following examples:

FIG. 1 is a vertical sectional side view showing an example of the automobile bumper of the invention. FIG. 2 is an exploded perspective view of the bumper shown in FIG. 1.

The automobile bumper 1 of the invention is basically made up of a hollow cushioning body 11 disposed between a surface skin member 10 and a metal reinforcement 12 to which the surface skin is fastened by bolts 6, and stays 3 adapted to fix the bumper to the car body. The surface skin member 10 is produced from a synthetic resin by sheet molding compound (SMC), injection molding, reaction injection molding (RIM), stamping, or sheet forming.

The suitable synthetic resins are thermoplastic resins, which include polypropylene (PP), high density polyethylene (HDPE), low-density polyethylene (LDPE), linear low-density polyethylene (LLDPE), polyvinyl chloride (PVC), polycarbonate (PC), nylon, polybutylene terephthalate (PBT), polyethylene terephthalate (PET), polystyrene (PS), polymethyl methacrylate (PMMA), polyoxymethylene (POM), acrylonitrile-butadiene-styrene resin (ABS), acrylonitrile-styrene copolymer (AS), ethylene-vinyl acetate copolymer (EVA), poly-4-methylpentene-1 (TPX), polyphenylene oxide (PPO), polyether sulfone (PES), polyphenylene sulfide (PPS), ethylene-propylene rubber (EPR), and ethylene-propylene-diene terpolymer (EPDM). The resins may be used singly or by blending dissimilar materials. Typical compositions include a mixture of polypropylene (PP), ethylene-propylene rubber (EPR), and high-density polyethylene (HDPE), a mixture of polypropylene (PP) and ethylene-propylene rubber (EPR), and a mixture of nylon and polypropylene (PP). The compositions may also be blended with a reinforcing filler such as glass fiber (GF), talc, mica, and calcium carbonate.

The hollow cushioning body 11 is produced, for example, by blow molding. It may have a box construction with high shock-absorbing properties. In addition, it has on its rear side recesses 5 formed by ribs 4. The body 11 is made of a thermoplastic resin capable of blow molding from a large, long parison. The thermoplastic resin is of the type used for the surface skin member 10, and it is blended with a modified polyolefin (CMP) to reduce the melt index (MI) to 0.5 or below as well as the melt flow rate (MFR) to 1.0 or below, thus holding drawdown resistance.

Figure 3:
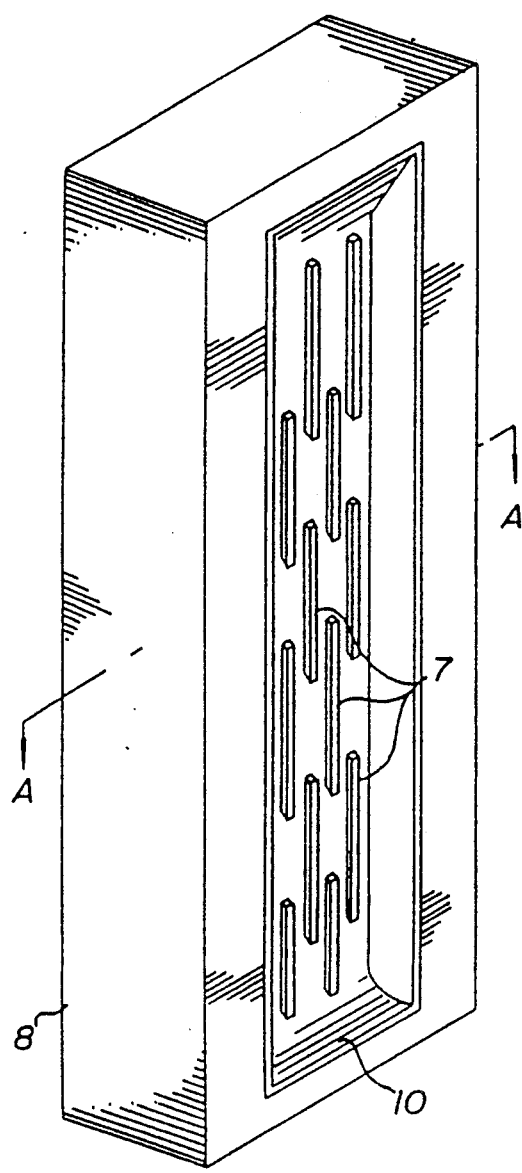
FIG. 3 is a perspective view of a blow mold with the surface skin member attached.
Figure 4:
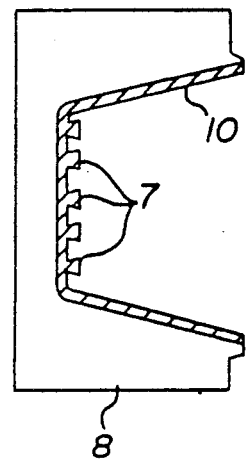
FIG. 4 is a sectional plan view of the blow mold shown in FIG. 3.
Figure 5:
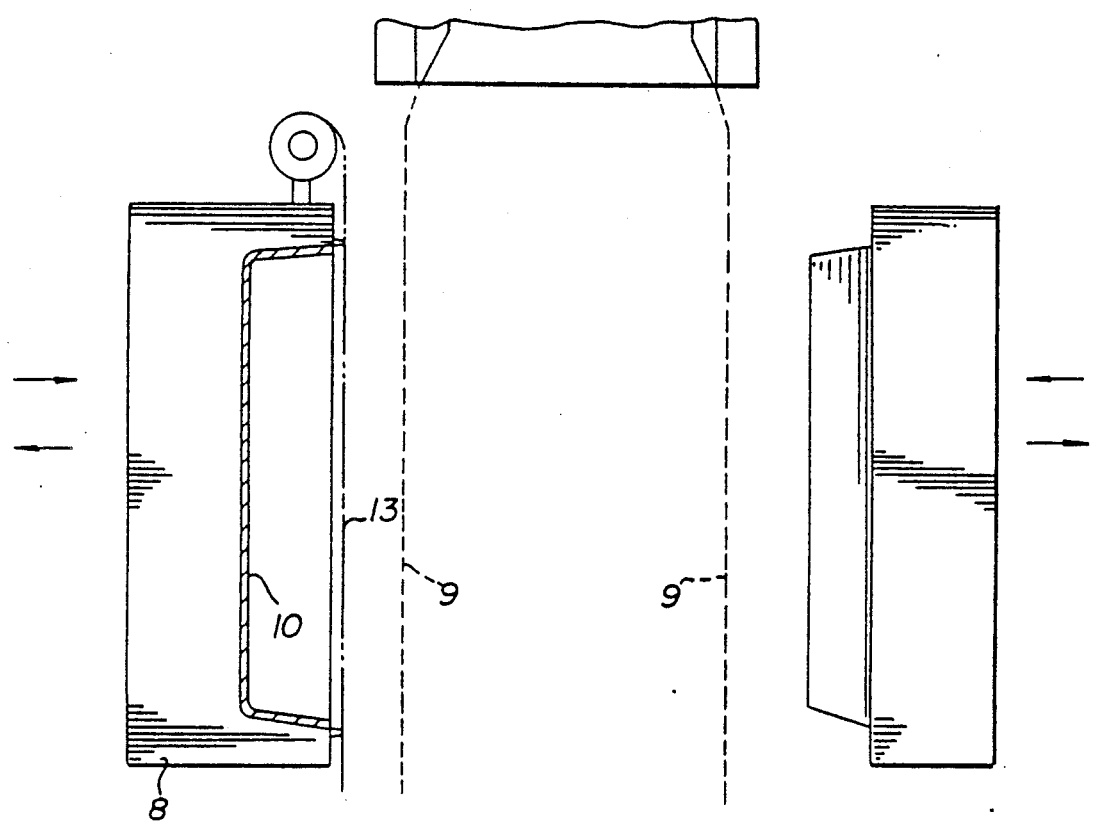
FIG. 5 is a front view, in partly vertical section, showing another example of a blow mold with the surface skin member placed in position.

The bumper of the invention is produced by the method illustrated in FIGS. 3, 4 and 5. The surface skin member 10 is first formed by injection molding the above-mentioned thermoplastic resin. The surface skin member 10 is formed on the back side with a plurality of locking ridges 7 adapted to facilitate the bonding to the hollow cushioning body 11.

The preformed surface skin member 10 is then loaded against the cavity inside surface of the blow mold 8 to be used for molding the hollow cushioning body 11. A parison 9 is then extruded and blown into a shape, until it is caused to press against the back side of the surface skin member 10 and the bonding occurs, both by fusion and mechanical means, due to the locking ridges 7 running over the skin 10. Thus there is provided the cushioning body 11 of a box construction unitarily formed with the surface skin member 10.

If required, the locking ridges 7 can be omitted. When omitted, the bonding is achieved by a fusible film 13. In this case, a film 13 of adhesive resin e.g., "tie-resin," is placed over an opening of the mold 8 before the parison 9 is extruded into the mold 8, as shown in FIG. 5. During blow molding, the film 13 serves as an insert and melts to bond the surface skin member 10 with the hollow cushioning body 11. The film 13 may be made of one of the materials used in the surface skin material 10 and the hollow cushioning body 11.

The automobile bumper 1 of the invention absorbs impact force due to the blow-molded hollow cushioning body 11 of box construction having the recesses 5 formed by the ribs 4. The automobile bumper has also a good appearance due to the injection-molded surface skin member 10 overlaying the hollow cushioning body. Thus the invention provides a bumper 1 excellent in both appearance and cushioning effects.

The following are results of an experiment conducted to confirm the effects of the invention:

The surface skin member of the bumper is first formed from a mixture of PP, EPR, and HDPE by using a large injection molding machine. A hollow cushioning body 11 measuring 1.8 m long, 0.15 m wide, and 0.08 m high is then blow-molded from high-density polyethylene (HDPE) by using a large blow molding machine (Model 1PB-200 C built by Ishikawajima-Harima Heavy Industries Co., Ltd.) while the preformed surface skin member is held inside the cavity. The resulting cushioning body is provided with a metal reinforcement as shown in FIG. 1. The sample bumper is secured to a car mock-up before a pendulum impact test is run. The pendulum is swung against the center of the bumper at about 8 km an hour, and the impact on the mock-up is then measured. The bumper of the invention had significant shock absorption, as the mock-up received an impact force of about 4 tons, or about 70% of the conventional bumper that has a cushioning body of foamed resin. The bumper of the invention has a good appearance, and equals that of the injection-molded bumper, and has broader industrial uses than a bumper prepared simply by blow molding.

INDUSTRIAL USES OF THE INVENTION

This invention provides a method for the production of an automobile bumper having a good appearance and high shock-absorbing properties. The method of the invention is economical in that the hollow cushioning body is bonded to the surface skin member during the course of blow-molding.

We claim:
1. An automobile bumper comprising:
   (a) a surface skin member made of a thermoplastic resin composition and having a smooth outer surface and a rear surface formed with a plurality of locking ridges, said locking ridges projecting rearwardly from said rear surface;
   (b) a hollow cushioning body having an encircling perimeter and made of a thermoplastic resin composition and formed by a blow molding method in the presence of said surface skin member in a blow mold such that it is firmly bonded to said surface skin member by mechanical engagement of said locking ridges with recesses in a front surface of said hollow cushioning body, said hollow cushioning body having a rear wall provided with an inward recess for absorbing the energy of shocks; and
   (c) a reinforcing member fixed to said surface skin member and said hollow cushioning body.
2. The automobile bumper as claimed in claim 1, wherein said inward recess is provided with at least one rib for absorbing shock energy.

* * * * *